Aug. 28, 1928.
J. H. NORTH
1,682,624
VALVE
Filed Aug. 15, 1927   2 Sheets-Sheet 1
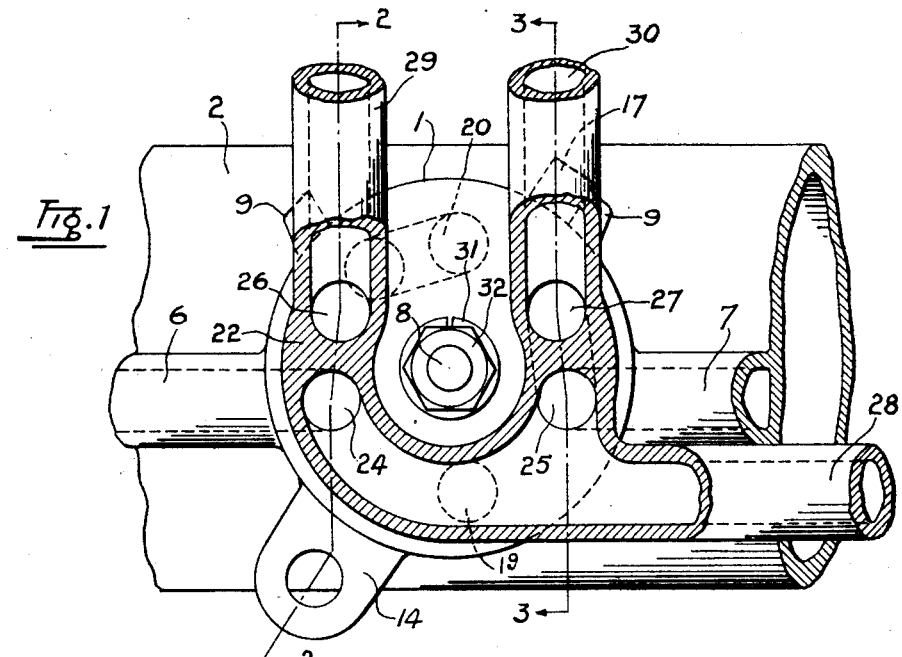
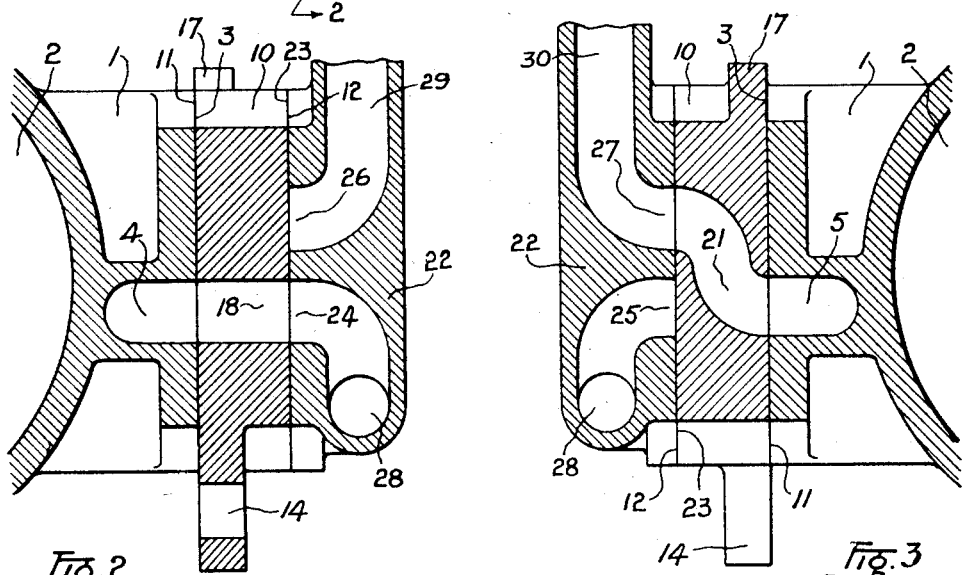
INVENTOR
JOHN HILL NORTH
BY Fetherstonhaugh & Co
ATTORNEYS Aug. 28, 1928.   1,682,624
J. H. NORTH
VALVE
Filed Aug. 15, 1927   2 Sheets-Sheet 2
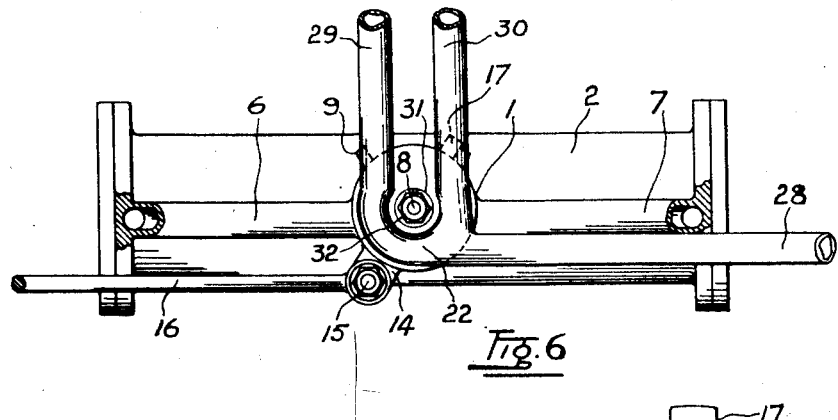
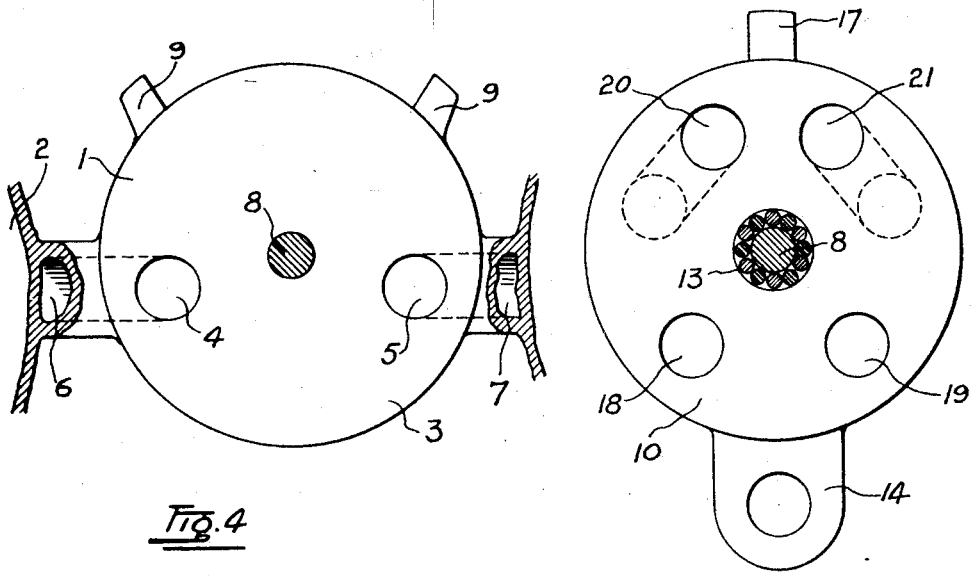
INVENTOR
JOHN HILL NORTH
BY Fetherstonhaugh & Co
ATTORNEYS Patented Aug. 28, 1928.

1,682,624

UNITED STATES PATENT OFFICE.

JOHN HILL NORTH, OF SEATTLE, WASHINGTON.

VALVE.

Application filed August 15, 1927. Serial No. 213,074.

My invention relates to improvements in valves which are particularly adapted for use with machines for dispensing semi-fluid commodities such as jam, lard or the like. The particular objects of which are to provide means whereby the ported passages within the valve are of the same contour and cross sectional area as the pipes through which the material is fed to the delivery. A further object is to provide means whereby the pressure of the material dispensed does not affect the operation of the valve.

The invention consists essentially of a pair of stationary ported members between which a ported disc is rocked to supply material from a common feed pipe to one or the other end of a cylinder and to deliver material from the cylinder through said valve to one or the other of two discharge pipes as will be more fully shown in the accompanying drawings and described in the following specification, in which:—

Fig. 1 is a general view of the valve showing the outer disc in section.

Fig. 2 is a sectional view taken on the line 2—2 of Figure 1.

Fig. 3 is a sectional view taken on the line 3—3 of Figure 1.

Fig. 4 is an elevational view of the valve body or inner disc.

Fig. 5 is an elevational view of the rocking disc.

Fig. 6 is a general view of the invention as attached to a filling machine cylinder.

In the drawings like characters of reference indicate corresponding parts in each figure.

The numeral 1 indicates generally the valve body, see Figures 2, 3 and 4, which is preferably formed integrally with a closed cylinder 2, see Figure 6, having a floating piston not shown, which is adapted to be moved therein in opposite directions by the pressure of the material entering through the valve. The valve body 1 is circular in form and is provided with a ground face 3 in which a pair of ports 4 and 5 are formed communicating with feed and discharge pipes respectively numbered 6 and 7 which in turn communicate respectively with the left and right ends of the cylinder 2. Extending from the centre of the face 3 is a pivot pin 8 having a thread at its outer end and extending from the periphery of the body 1 is a pair of stops 9, the purpose of which will hereinafter appear.

The numeral 10 indicates a rocking disc, see Figures 2, 3 and 5, which is provided with opposed faces 11 and 12, and is preferably fitted with a roller bearing 13 adapted to fit the pivot pin 8. Extending from the lower periphery of the disc 10 is an eye 14 which is adapted to be engaged by the pin 15 of a suitably operated connecting rod 16 adapted to rock the disc 10 upon its pivot at suitable intervals to control the flow and return of semi-fluid material through the valve. Extending from the upper periphery of the disc 10 is a projection 17 which is adapted to contact alternately with the stops 9 as the disc is rocked about its pivot by the connecting rod 16. The disc 10 is provided with a plurality of ports which are numbered 18, 19, 20, and 21, the ports 18 and 19 extend directly from one face of the disc to the other, whereas the ports 20 and 21 are curved between their face extremities.

The numeral 22 indicates the outer disc or cover of the valve, which is ground to a flat face 23 which is adapted to bear against the face 12 of the disc 10. This disc is provided with four ports 24, 25, 26 and 27, the ports 24 and 25 jointly communicating with an inlet pipe 28 connected to a suitable source of supply, and the ports 26 and 27 communicating respectively with a pair of upstanding delivery pipes 29 and 30. The outer disc is centrally apertured to permit the passage of the pivot pin 8, which pin is fitted with a spring washer 31 and a nut 32 so that a suitable tension can be applied to the valve.

Having thus described the several parts of my invention I will now briefly explain its function.

When the disc 10 has been moved to the limit of its stroke in a clockwise direction by the connecting rod 16, the material flowing through the inlet pipe 28 will pass through the port 24 of the outer cover 22, see Figure 2, through the port 18 of the rocking disc 10, thence through the port 4 of the valve body and through the pipe 6 to the left end of the cylinder 2. The material thus entering the cylinder causes the floating piston to move along the cylinder to the right and the material in the right end of the cylinder to be expressed therefrom through the pipe 7 to the valve body 1 where it passes through the port 5, see Figure 3, thence through the offset port 21 of the rocking disc to the port 27 of the cover 22 from whence it flows upwards through the delivery pipe 30. When the disc 10 is rocked in an anticlockwise direction to the end of its stroke, the material from the inlet pipe passes through the port 25 of the cover 22, thence through the port 19 of the rocking disc 10, the port 5 of the valve body 1 and the pipe 7 to the right end of the cylinder 2, thereby driving the piston to the left and the material in the left end of the cylinder through the pipe 6, the port 4 of the body 1, the offset port 20 of the rocking disc, the port 26 of the cover 22, and the pipe 29 to discharge. It will therefore be seen that the ports 4 and 5 with their communicating pipes 6 and 7 both serve as inlet and outlet to opposite ends of the piston and when the rocking disc 10 is in either operative position that one of the said ports 4 or 5 is serving as an inlet port and the other serving as an outlet port. It will also be clearly seen that since the ports are of the same or greater cross sectional area than the pipes with which they communicate, no restriction or flow acceleration will be caused to the material passing therethrough over the normal flow through the pipes, so that no increased temperature, emulsification or other objectionable effect is produced in the material acted upon. The ports in the rocking disc are in all cases clear passages extending through from one face to the other, so that the pressure of the material being fed to or from the machine is balanced on both sides of the disc, hence no appreciable effort is required to move the valve from one position to another.

What I claim as my invention is:

1. A valve comprising a valve body having ports communicating with passages adapted to serve as both inlet and outlet ducts, a cover block having ports communicating with a common feed pipe and a delivery passage, a ported disc rockingly mounted between the cover block and the valve body which is adapted to be moved into operative position whereby the material fed through the feed pipe is directed inwardly through one of the first mentioned passages and outwardly through the other, thence through the delivery passage.

2. A valve comprising a valve body having ports communicating with passages adapted to serve as both inlet and outlet ducts, a cover block having ports communicating with a common feed pipe and a pair of delivery passages, a ported disc rockingly mounted between the cover block and the valve body which is adapted to be moved into operative positions whereby the material fed through the feed pipe is directed inwardly through one of the first mentioned passages and outwardly through the other, thence to one of the delivery passages.

3. A valve comprising a valve body having ports adapted to communicate with inlet or delivery passages, a cover block having ports adapted to communicate with other passages and a disc rockingly mounted between the cover block and the body and having ports all of which extend from one face of the disc to the other, which disc is adapted to be moved to establish communication between the ports of the cover block and those of the valve body through the ports of the disc.

4. A valve comprising a ported body and a ported cover block between which a ported disc is adapted to be rocked to establish communication between ports of the body and ports of the block, and means for exerting a yielding pressure tending to force the block to the disc and the disc to the valve body.

Dated at Seattle this 4th day of August, 1927.

JOHN HILL NORTH.